No. 749,931. PATENTED JAN. 19, 1904.
G. HERBERT, Jr.
APPARATUS FOR CLEANING DRIED FRUITS.
APPLICATION FILED JAN. 7, 1902.
NO MODEL.
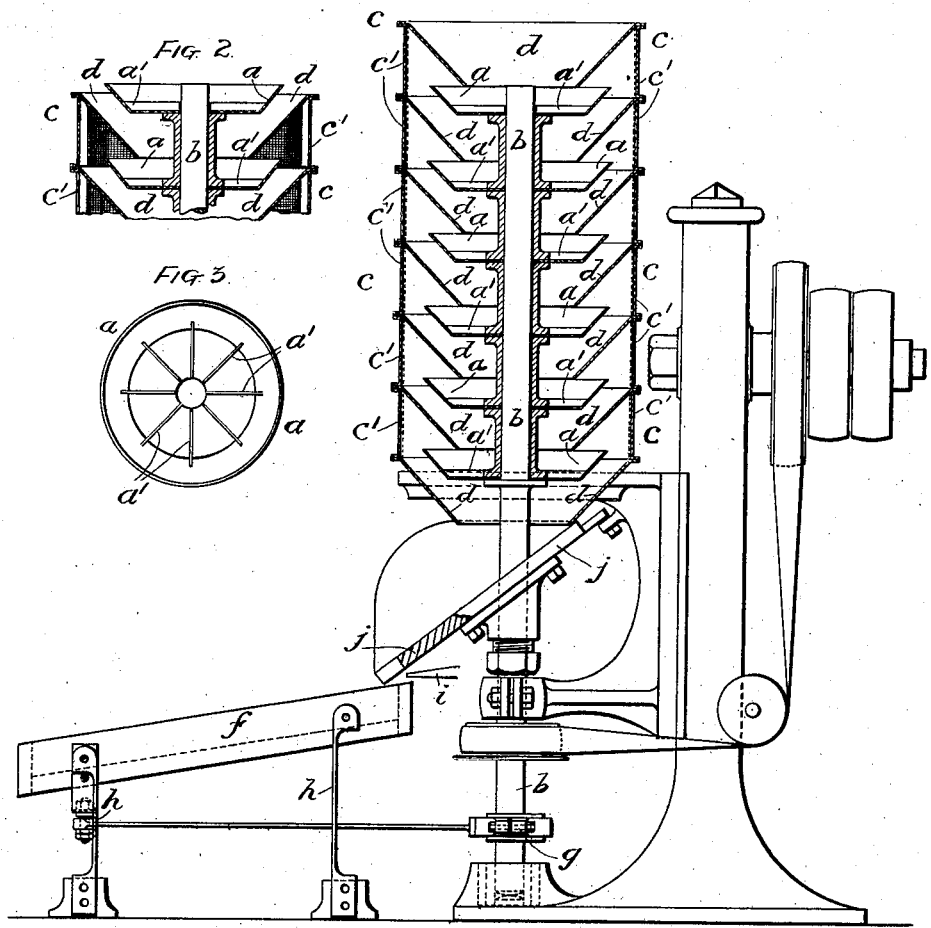
Witnesses.
Harry Ellis Chandler
Ethel M. Tucker
Inventor:
George Herbert, Jr.
By Chandler & Chandler
Attys.

No. 749,931. Patented January 19, 1904.

UNITED STATES PATENT OFFICE.

GEORGE HERBERT, JR., OF GLASGOW, SCOTLAND.

APPARATUS FOR CLEANING DRIED FRUITS.

SPECIFICATION forming part of Letters Patent No. 749,931, dated January 19, 1904.

Application filed January 7, 1902. Serial No. 88,787. (No model.)

*To all whom it may concern:*

Be it known that I, GEORGE HERBERT, Jr., a citizen of the United Kingdom of Great Britain and Ireland, residing at Kingston Biscuit Factory, Kinning street, Kingston, Glasgow, Scotland, have invented certain new and useful Improvements in Apparatus for Cleaning Dried Fruits, (for which application for a patent has been made in Great Britain, No. 13,689, dated July 5, 1901,) of which the following is a specification.

This invention has for its object to provide improved apparatus of simple and inexpensive construction for removing the stalks from raisins or currants, for husking almonds and the kernels of nuts, and otherwise cleaning dried fruits without bruising them in the operation.

In the accompanying drawings, which illustrate the invention, Figure 1 is a vertical section of the improved fruit-cleaning apparatus. Fig. 2 is a vertical section of part of the apparatus under a modified form, and Fig. 3 is a plan of the disks or trays.

The apparatus is composed of a series of superposed disks or trays $a$, provided with radial ribs $a'$ and secured upon a vertical rotating shaft $b$, fitted within a vertical drum, cone, or cylinder $c$, having a rough inner surface or composed of or having wire-gauze or like material upon its inner surface. The cylinder $c$ is shown as stationary, and it is composed of a series of sections $c'$, flanged at either end, each pair of sections holding between them the flange of a downwardly and inwardly inclined ring shelf or conical frustum $d$, so that one cone or shelf $d$ projects between each pair of trays $a$. The fruit is led onto the uppermost of the disks or trays $a$ and by a centrifugal action is thrown over the edge or lip thereof against the gauze drum or against the wire-gauze lining $e$ (shown at Fig. 2) or roughened surface of the drum. Thence it drops down the inclined shelf $d$ onto the disk or tray $a$ below, is in like manner thrown therefrom against the inner surface of the drum $c$, and passes down to the next disk or tray $a$ in succession and from disk to disk until it finally emerges at the bottom onto a vibrating sieve $f$ or other device adapted to separate the stalks or husks from the fruit. This sieve $f$ is vibrated by means of an eccentric or crank on the rotating shaft $b$, the sieve $f$ being carried upon spring blades or arms $h$, so that an elastic movement is imparted to it.

The sieve $f$ may be dispensed with and the husks or stalks removed as the cleaned fruit is delivered onto a receptacle by means of a fan or blower, whose nozzle $i$ is placed below the chute $j$, as shown.

When it is desired to use water for the purpose of further cleaning the fruit, a space is left between the wire-gauze lining and the walls of the cylinder $c$, as shown at Fig. 2.

The apparatus may also be used for blending tea.

Having now described the invention, what I claim, and desire to secure by Letters Patent, is—

In a fruit-cleaning machine, the combination with a casing comprising a series of flanged sections secured one to another by the flanges, of a plurality of frusto-conical shelves having flanges projecting outwardly therefrom at their wider ends, each of said shelves lying with its flange between the flanges of two of the cylindrical sections, said shelves projecting downwardly and inwardly of the casing, a rotatable shaft disposed longitudinally of the casing and centrally thereof, a plurality of circular trays secured to the shaft, each of said trays lying between two of the shelves and being adapted to receive the fruit from the shelves and to throw off said fruit centrifugally through rotation of the shaft and trays, a plurality of ribs within each tray projecting upwardly from the bottom thereof and radially from the shaft, an inclined chute disposed below the opening of the lowermost shelf, a plurality of spring uprights mounted adjacent to the base of the shaft, a screening-tray secured to the upper ends of the uprights and disposed with one of its ends below the lower end of the inclined chute, a pitman eccentrically connected at one of its ends with the shaft and secured at its remaining end to the screening-tray, and means for revolving the shaft.

In witness whereof I have hereunto set my hand in presence of two witnesses.

GEORGE HERBERT, JR.

Witnesses:
WALLACE FAIRWEATHER,
JNO. ARMSTRONG, Jnr.